UNITED STATES PATENT OFFICE 2,323,037

PROCESS OF VULCANIZING RUBBER AND PRODUCT PRODUCED THEREBY

Marion W. Harman, Nitro, W. Va., assignor to Monsanto Chemical Company, St. Louis, Mo., a corporation of Delaware No Drawing. Application November 6, 1937, Serial No. 173,215

16 Claims. (Cl. 260—787)

The present invention relates to a new class of rubber vulcanization accelerators, to a process of vulcanizing rubber and to the vulcanization products obtained with the aid of said new vulcanization accelerators.

The new and preferred class of rubber vulcanization accelerators comprise the reaction products obtainable by interacting a mercapto-thiazole with formaldehyde and further reacting with an acyl halide. The accelerators of this invention are believed to possess the following structural formula

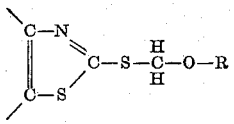

where R is an acyl radical, although the invention is not to be understood as limited by any formula or theories as to the structure of the preferred class of compounds. These compounds are conveniently prepared by reacting a thiazyl thio methylene hydrin with an acyl halide preferably an acyl chloride.

The preferred class of materials may be employed alone as accelerators, but are preferably employed in conjunction with organic nitrogen containing vulcanization accelerators as activators thereof, such for example as diphenyl guanidine, diortho tolyl guanidine, hexamethylenetetramine, Schiff's bases, guanidine salts, for example diphenyl guanidine acetate, diphenyl guanidine phthalate and analogues and equivalents thereof.

As typical examples of mercapto-thiazoles which are reactive with formaldehyde and in turn with an acyl halide to form therewith a new class of vulcanization accelerators are 2-mercapto 4-methyl thiazole; 2-mercapto benzothiazole; 2 - mercapto naphtha - thiazole; 2-mercapto 6-nitrobenzo-thiazole; 2-mercapto 5-chlorbenzo-thiazole; 2-mercapto 5-aminobenzo-thiazole; 2-mercapto 4-phenyl benzo-thiazole; 2-mercapto 4-methyl benzo-thiazole; 2-mercapto 4-ethyl benzo-thiazole; 2-mercapto 4-methoxy benzo-thiazole and analogues and equivalents thereof.

Typical examples of acyl halides which form the preferred class of materials when reacted with the formaldehyde reaction products of mercapto thiazoles as illustrated above are benzoyl chloride; phthalyl chloride; the alpha and beta naphthoyl chlorides; the ortho and para hydroxy benzoyl chlorides; n-butyryl chloride and analogues and equivalents thereof.

The following specific examples are to be understood as illustrative embodiments of the invention and not in any sense limitative of the scope thereof.

EXAMPLE I

Substantially 43.5 parts by weight of the molmol addition product of 2-mercapto benzo-thiazole and formaldehyde (equivalent to substantially 0.2 molecular proportions) and substantially 28.1 parts by weight of benzoyl chloride (substantially 0.2 molecular proportions) were dissolved in substantially 177 parts by weight of benzene and the solution heated to refluxing temperature for three hours. The clear solution of the reaction product was cooled to room temperature and extracted with dilute sodium carbonate solution, washed with water, dried over calcium chloride and the solvent removed by distillation under a slight vacuum. The product was obtained in good yield as an amber colored oil. The reaction involved is believed to take place as follows:

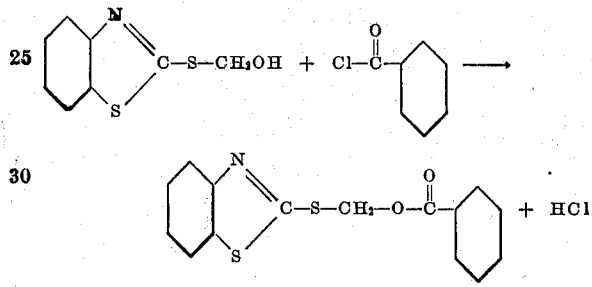

Where convenient or desirable other solvents may be employed as for example toluene.

The benzo-thiazyl 2-thio methylene benzoate obtained as described above was incorporated alone and in conjunction with a basic nitrogen containing accelerator into a typical rubber stock comprising

|  | Stock A | Stock B | Stock C |
|---|---|---|---|
| Pale crepe | 100 | 100 | 100 |
| Zinc oxide | 5 | 5 | 5 |
| Sulfur | 3 | 3 | 3 |
| Stearic acid | 1 | 1 | 1 |
| Benzothiazyl 2-thio methylene benzoate | 1.0 | 0.8 | 0.4 |
| Diphenyl guanidine |  | 0.2 | 0.6 |

The rubber stocks so compounded were vulcanized by heating for different periods of time at the temperature of thirty pounds of steam pressure per square inch and the following modulus and tensile properties obtained upon testing the cured rubber products.

*Table I*

| Stock | Cure, time in mins. | Modulus of elasticity in lbs./in.² at elongations of— | | | Tensile at break in lbs./in.² | Ult., elong., per cent |
|---|---|---|---|---|---|---|
| | | 300% | 500% | 700% | | |
| B | 30 | 97 | 184 | 565 | 1,880 | 927 |
| C | 30 | 133 | 263 | 945 | 2,270 | 870 |
| B | 45 | 148 | 295 | 965 | 2,360 | 865 |
| C | 45 | 156 | 368 | 1,385 | 2,730 | 820 |
| A | 60 | 64 | 99 | 223 | 935 | 1,000 |
| B | 60 | 158 | 360 | 1,295 | 2,530 | 820 |
| C | 60 | 186 | 453 | 1,690 | 2,835 | 785 |

The above data show that the preferred class of materials, for example benzothiazyl 2-thio methylene benzoate, show accelerating properties and in the preferred embodiment of the invention are strongly activated by basic nitrogen containing accelerators, for example diphenyl guanidine.

EXAMPLE II

As a further specific embodiment of the invention substantially 43.5 parts by weight of the mol-mol addition product of mercapto benzothiazole and formaldehyde (equivalent to substantially 0.2 molecular proportions) and substantially 21.2 parts by weight of 95.6% phthalyl chloride (equivalent to substantially 0.1 molecular proportions) were dissolved in a suitable solvent, for example 220 parts by weight of chlorbenzene, although other solvents may be employed where desired. The solution was heated to refluxing temperature for two hours and then allowed to cool to room temperature and extracted with 2% sodium hydroxide, washed with water, dried over calcium chloride and the solvent distilled off under reduced pressure. The reaction product remained as a brown resin. The reaction is believed to be represented by the following equation:

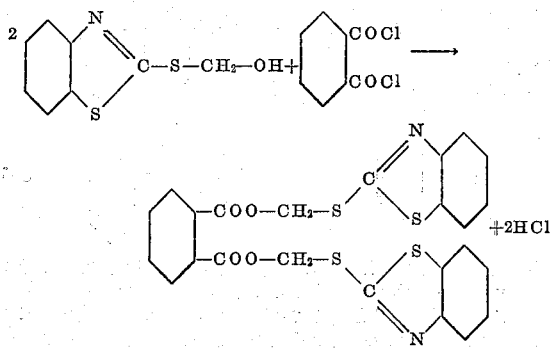

The di(benzothiazyl 2 - thio methylene) phthalate obtained as described above was incorporated alone and in conjunction with a basic nitrogen containing accelerator into a typical rubber stock comprising

| | Stock D | Stock E | Stock F |
|---|---|---|---|
| Pale crepe | 100 | 100 | 100 |
| Zinc oxide | 5 | 5 | 5 |
| Sulfur | 3 | 3 | 3 |
| Stearic acid | 1 | 1 | 1 |
| Di(benzothiazyl 2-thio methylene) phthalate | 1.0 | 0.8 | 0.4 |
| Diphenyl guanidine | | 0.2 | 0.6 |

The stocks so compounded were vulcanized by heating for different periods of time at the temperature of thirty pounds of steam pressure per square inch and the following modulus and tensile properties found on testing the cured rubber products:

*Table II*

| Stock | Cure time in mins. | Modulus of elasticity in lbs./in.² at elongations of— | | | Tensile at break in lbs./in.² | Ult. elong., per cent |
|---|---|---|---|---|---|---|
| | | 300% | 500% | 700% | | |
| D | 45 | 64 | 89 | 167 | 382 | 880 |
| E | 45 | 166 | 366 | 1,250 | 2,740 | 845 |
| F | 45 | 158 | 324 | 1,210 | 2,600 | 835 |
| D | 60 | 64 | 138 | 229 | 933 | 980 |
| E | 60 | 183 | 430 | 1,620 | 3,200 | 830 |
| F | 60 | 177 | 431 | 1,640 | 3,200 | 830 |

The above data also show the accelerating properties of the preferred class of materials, for example di(benzothiazyl 2-thio methylene) phthalate and show that in the preferred embodiment of the invention wherein the preferred class of materials are employed in conjunction with an organic nitrogen containing accelerator, for example diphenyl guanidine, the new and preferred class of accelerators are strongly activated and produce an improved rubber product.

The present invention is not limited to the specific examples hereinbefore set forth wherein the preferred accelerators are employed. Other ratios of the compounding ingredients than those mentioned in the examples as well as other well-known fillers, pigments and the like may be employed in the production of various types of rubber compounds, and are apparent to those skilled in the art to which the invention pertains. The present invention is limited solely by the following claims.

What is claimed is:

1. The process of vulcanizing rubber which comprises heating rubber and sulfur in the presence of a rubber vulcanization accelerator comprising a neutral ester having the formula

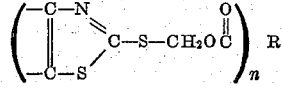

where R is selected from the group consisting of aromatic hydrocarbon and hydroxy substituted aromatic hydrocarbon groups and $n$ is an integer less than three.

2. The process of vulcanizing rubber which comprises heating rubber and sulfur in the presence of a rubber vulcanization accelerator comprising a neutral ester of an aromatic carboxylic acid containing less than three carboxyl groups in which the aromatic group of said acid is an aromatic hydrocarbon, the sole esterifying group being an arylene thiazyl 2-thio methylene hydrin.

3. The process of vulcanizing rubber which comprises heating rubber and sulfur in the presence of a rubber vulcanization accelerator comprising a neutral ester of an aromatic carboxylic acid containing less than three carboxyl groups in which the aromatic group of said acid is an aromatic hydrocarbon, the sole esterifying group being a benzothiazyl 2-thio methylene hydrin.

4. The process of vulcanizing rubber which comprises heating rubber and sulfur in the presence of benzo-thiazyl 2-thio methylene benzoate.

5. The process of vulcanizing rubber which comprises heating rubber and sulfur in the presence of di(benzo-thiazyl 2-thio methylene) phthalate.

6. The process of vulcanizing rubber which comprises heating rubber and sulfur in the presence of a mixture of a guanidine accelerator and a neutral ester having the formula

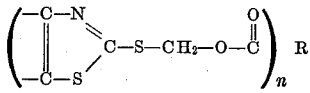

where R is selected from the group consisting of aromatic hydrocarbon and hydroxy substituted aromatic hydrocarbon groups and $n$ is an integer less than three.

7. The process of vulcanizing rubber which comprises heating rubber and sulfur in the presence of a mixture of a guanidine accelerator and benzo-thiazyl 2-thio methylene benzoate.

8. The process of vulcanizing rubber which comprises heating rubber and sulfur in the presence of a mixture of diphenyl guanidine and di(benzo-thiazyl 2-thio methylene) phthalate.

9. The vulcanized rubber product obtained by heating rubber and sulfur in the presence of a rubber vulcanization accelerator comprising a neutral ester having the formula

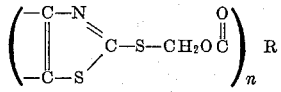

where R is selected from the group consisting of aromatic hydrocarbon and hydroxy substituted aromatic hydrocarbon groups and $n$ is an integer less than three.

10. The vulcanized rubber product obtained by heating rubber and sulfur in the presence of a rubber vulcanization accelerator comprising a neutral ester of an aromatic carboxylic acid containing less than three carboxyl groups in which the aromatic group of said acid is an aromatic hydrocarbon, the sole esterifying group being an arylene thiazyl 2-thio methylene hydrin.

11. The vulcanized rubber product obtained by heating rubber and sulfur in the presence of a rubber vulcanization accelerator comprising a neutral ester of an aromatic carboxylic acid containing less than three carboxyl groups in which the aromatic group of said acid is an aromatic hydrocarbon, the sole esterifying group being a benzothiazyl 2-thio methylene hydrin.

12. The vulcanized rubber product obtained by heating rubber and sulfur in the presence of benzo-thiazyl 2-thio methylene benzoate.

13. The vulcanized rubber product obtained by heating rubber and sulfur in the presence of di(benzo-thiazyl 2-thio methylene) phthalate.

14. The vulcanized rubber product obtained by heating rubber and sulfur in the presence of a mixture of a guanidine accelerator and a neutral ester having the formula

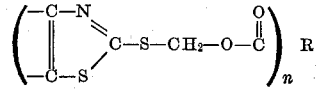

where R is selected from the group consisting of aromatic hydrocarbon and hydroxy substituted aromatic hydrocarbon groups and $n$ is an integer less than three.

15. The vulcanized rubber product obtained by heating rubber and sulfur in the presence of a mixture of diphenyl guanidine accelerator and benzothiazyl-2-thio methylene benzoate.

16. The vulcanized rubber product obtained by heating rubber and sulfur in the presence of a mixture of a guanidine accelerator and di(benzo-thiazyl 2-thio methylene) phthalate.

MARION W. HARMAN.